March 17, 1931.  J. S. STEWART  1,796,311
AGRICULTURAL MACHINE
Filed Aug. 25, 1927  2 Sheets-Sheet 1
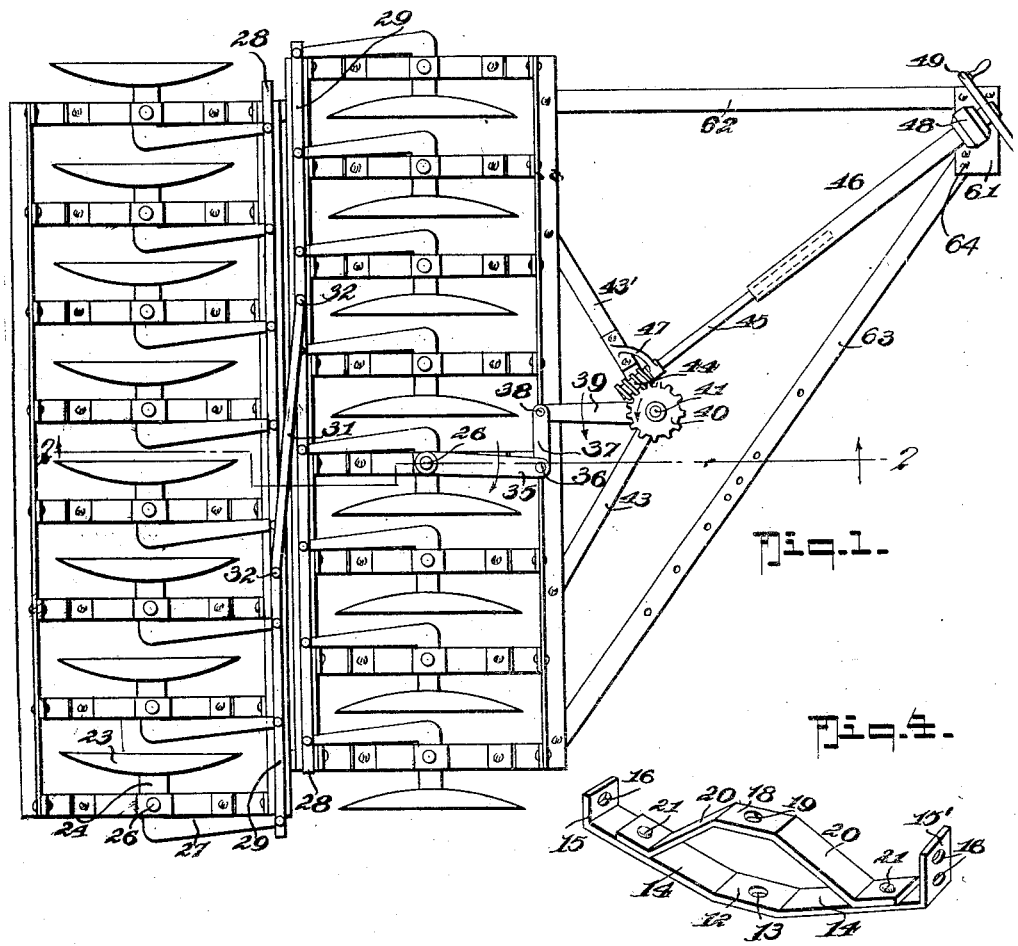
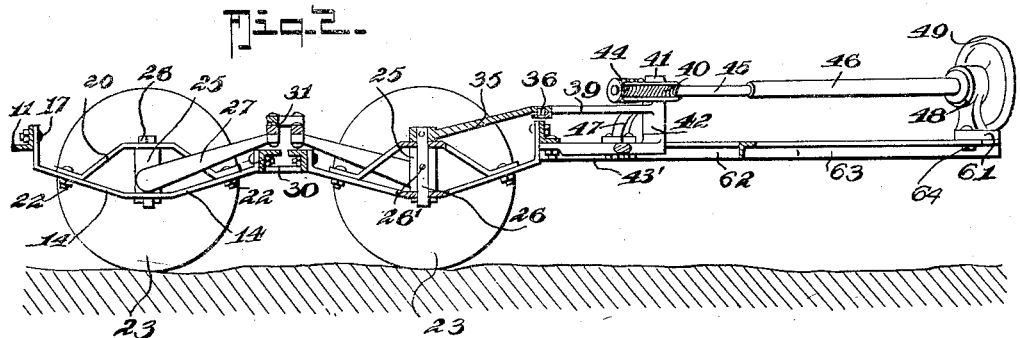
INVENTOR
J. S. Stewart.
BY
ATTORNEY March 17, 1931.  J. S. STEWART  1,796,311
AGRICULTURAL MACHINE
Filed Aug. 25, 1927  2 Sheets-Sheet 2
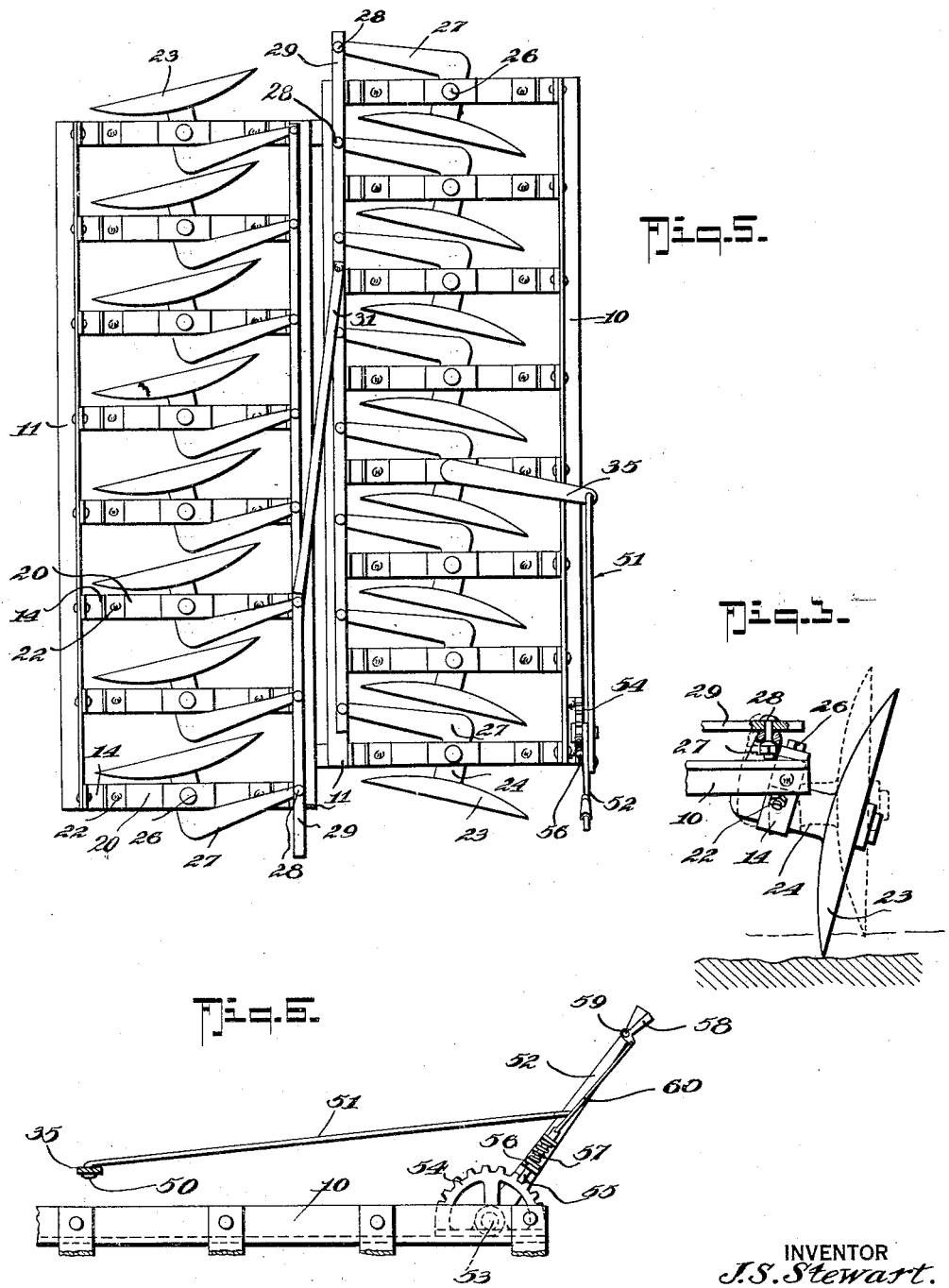
INVENTOR
J. S. Stewart.
BY
ATTORNEY Patented Mar. 17, 1931

1,796,311

UNITED STATES PATENT OFFICE

JAMES S. STEWART, OF REDLANDS, CALIFORNIA, ASSIGNOR, BY MESNE ASSIGNMENTS, TO GEORGE VOSS, OF SAN BERNARDINO, CALIFORNIA

AGRICULTURAL MACHINE

Application filed August 25, 1927. Serial No. 215,424.

This invention relates to improvements in agricultural machines generally, and more particularly to disc gang harrows.

The principal object of the invention is to provide a two gang tractor harrow of the offset or orchard type, and one wherein the several discs making up a gang are mounted in a manner to be simultaneously adjusted to various angular cutting positions without effecting an angular adjustment of the gang frame for the purpose.

Another object of the invention is to provide a two gang type of disc harrow as hereinbefore characterized, wherein the several discs are provided with individual mountings of a simple but efficient construction and arrangement, whereby the repair or replacement of the one disc and mounting unit is facilitated without interference with or by the other of such units.

A further object of the invention is the provision of a simple but effective means for adjusting the angular cutting positions of the several discs of a gang simultaneously and with uniformity one with respect to the other, and from a point convenient to the position of the operator on a tractor located in offset relation to the harrow.

Another object of the invention is the adaptability of the adjusting means aforesaid to effect the simultaneous angular adjustment of the discs of two or more gangs from the normal position of the operator.

A still further object of the invention is the provision of a means whereby the vertical angle of the several discs of a gang harrow may be altered correspondingly for the effective cutting operations of the discs in soil of different degrees of hardness.

With the foregoing and other equally important objects and advantages in view, the invention resides in the certain new and useful combinations, constructions and arrangements of parts as will be hereinafter more fully described, set forth in the appended claims, and illustrated in the accompanying drawings, in which:

Figure 1 is a top plan view of a preferred embodiment of the invention,

Figure 2 is a vertical longitudinal section taken on the line 2—2 of Figure 1,

Figure 3 is an enlarged fragmentary elevation, partly in section, showing one of the disc harrow blades and its independent mounting, Figure 4 is a perspective view of one of the cross members or trusses of a gang frame for supporting a disc blade and its mounting, Figure 5 is a top plan view similar to that of Figure 1, but showing a modified form of means for effecting the angular cutting positions of the several disc blades, and Figure 6 is a fragmentary front elevation of the disc gang frame showing the modified form of operating device for the adjusting means.

Referring to the drawings, wherein similar characters of reference designate corresponding parts throughout the several corelated views thereof, and more particularly to Figures 1 to 4 inclusive, the preferred embodiment of the invention as shown therein comprises a pair of disc gang harrow frames each of substantially rectangular form and consisting of a front member or bar 10 and a rear member or bar 11, and a plurality of cross members or trusses extending between and connecting the same at their opposite ends and in equidistantly spaced relation. These cross members or trusses each comprise a lower member or bar having a short horizontal portion 12, apertured as at 13, disposed medially between oppositely and upwardly inclined portions 14, which have their free ends angularly bent to provide securing flanges 15 and 15' disposed in abutting relation to the inner sides of the front and rear frame members or bars 10 and 11 for attachment thereto. These flanges 15 and 15' are apertured, as at 16, for the passage through the same of securing bolts 17 engaged in complemental apertures formed in the members or bars 10 and 11 for the purpose. It is to be noted that the flange portion 15' is of a slightly greater length than that of the flange portion 15, and is provided with two of the apertures 16 arranged one above the other. An upper member or bar having a horizontal portion 18, apertured, as at 19, disposed medially between oppositely and downwardly inclined portions 20 is supported on the upper side of the lower member or bar by means of angularly bent flange portions 21 being formed at the free ends of the inclined portion 20, and seated on the inclined portions 14 of the lower member or bar at points thereon equidistantly spaced inwardly from the upturned flange portions 15 and 15' of the latter. These flange portions 21 are preferably secured to the portion 14 by means of bolts 22.

The invention contemplates the provision of a number of disc units corresponding to the number of cross bars or trusses disposed between the front and rear frame members or bars 10 and 11, and each of these units comprises a disc blade 23 mounted for rotation on a spindle 24, which extends horizontally from a cylindrical bearing portion 25. This bearing portion 25 is positioned vertically between the lower and upper horizontal portions 12 and 18 of the lower and upper portions of the cross bars or trusses of the frame, and has a concentric bore extending through the same which is disposed in alignment with the apertures 13 and 19 of the horizontal portions 12 and 18 for the insertion therethrough of a pivot bolt or the like 26, by which arrangement the several disc blades 23 are disposed in alignment substantially in the plane of the longitudinal center of the frame.

For the purpose of effecting an angular adjustment of the disc blades 23, the bearing portion 25, of the spindles 24, each have connected to one side of the same one end of a lever or arm 27, which inclines upwardly from its point of connection with the bearing 25. The levers or arms 27 of the front or leading gang frame extend in a rearward direction and have their free ends disposed in the plane of the rear frame member or bar 11, and above the same, while those of the rear or trailing gang frame extend in a forward direction and have their free ends similarly disposed in the plane of and above the front frame member or bar 10 of this latter frame. For the simultaneous adjustment of all of the disc blades 23 or a gang of the same, the free ends of the levers or arms 27 are pivotally connected, as at 28, to an operating member or bar 29, which, when moved in either direction longitudinally of a gang frame force the levers or arms 27 in a corresponding direction to impart a turning movement to the bearings 25 with the result that the spindles 24 are swung in a horizontal plane and angularly to one side or the other of the longitudinal center of the gang frame and the disc blades 23 to similar angular positions with respect to the transverse center of the frame. The disc blades 23 may also be adjusted angularly in a vertical direction by rocking the cross members or trusses of the gang frames on the bolts 17 employed for securing the opposite ends of the same to the front and rear frame members 10 and 11. To admit of this rocking movement to the trusses, a required amount of freedom of movement is provided between the ends of the arms 27 and the bolts 28 connecting the same to the operating rods or bars 29, as is clearly shown in Figure 3.

As shown, two of the gang frames are to be coupled together, and, in the present instance, the same are so illustrated in both of the Figures 1 and 5. In effecting this coupling of the two frames together, one in rear of the other, the same will be disposed in slightly offset relation, so that the disc blades 23 of the trailing gang will operate in paths equidistantly spaced to one side of those defined by the travel of the leading disc blades, so that the soil will be more thoroughly broken up and conditioned in the forward travel of both gangs. The coupling of the two frames together is to be accomplished in any suitable or desired manner, or by bolting the opposite vertical flanges of a pair of substantially U-shaped connecting elements 30, to the opposed faces of the front and rear frame members or bars 10 and 11 of the rear and front gang frames respectively, as shown in Figure 2. When the gangs are properly assembled and coupled together, the levers or arms 27 of the leading gang will be disposed in a rearward direction, while those of the trailing gang will be disposed in a forward direction, substantially as shown. In this position, the operating members or bars 29 of both sets of levers or arms 29 will be disposed in parallel relation corresponding to the parallel relation of the adjacent sides of the front and rear gang frames. To effect the simultaneous angular adjustment of the disc blades 23 of both gangs, the two operating members or bars 29 are coupled together by means of a diagonally extending member or bar 31, which is pivoted at its opposite ends, as at 32, to the same for the purpose.

The multiple disc gang harrow as thus constructed and arranged, is to be drawn by or operated from a tractor or the like (not shown), which is to be attached to the coupling member 61 at the forward end of a draft frame formed of a longitudinal member or bar 62 projecting from the forward side of the leading gang frame, immediately inward of one end thereof, and a second member or bar 63 projecting from the same side of the leading gang frame inwardly of the opposite end of the same, and extending therefrom in a diagonal direction. The forward ends of these draft frame members 62 and 63 are connected to the coupling member 61 by suitable fastenings such as bolts or the like 64.

As shown in Figures 1 and 2, the disc blades 23 are to be adjusted as desired through the medium of an arm or lever 35, which has one end secured to the pivot bolt 26 of the bearing portion 24 of one of the intermediate disc blades 23 of the leading gang frame, and its other end pivotally connecting, as at 36, one end of a shorter arm or lever 37 disposed in angular relation to the arm or lever 35. This pivot bolt 26, as shown in Figure 2, is connected to the associated bearing portion 24 by means of a cotter pin or the like 26', whereby the turning movement of the bolt 26, under the action of the arm or lever 35, is transmitted to the bearing portion 24, and through its arm 27 to the longitudinal member or bar 29 through which similar turning movement is imparted to all of the several disc blades 23 of the leading gang frame. This endwise movement of the member or bar 29 is transmitted to the longitudinal member or bar 28 connecting the lever arms 27 of the disc blades 23 of the rear or trailing gang frame, and in a manner that the latter disc blades 23 are simultaneously turned to an angular position corresponding to that assumed by the disc blades of the leading gang, substantially as shown in dotted lines in Figure 1. The opposite end of the shorter arm or lever 37 is, in turn, pivotally connected, as at 38, to the free end of an arm 39 projecting radially from a worm wheel 40, which is keyed to a shaft 41 journalled vertically in a suitable bearing 42 at the outer end of a substantially V-shaped frame formed by the members or bars 43 and 43' secured in horizontal position at the forward side of the front member or bar 10, of the leading gang frame. The worm wheel 40 is arranged in mesh with a worm 44 formed at the rear end of a shaft section 45, which has its forward end telescopically engaged in a socket opening through the rearwardly directed end of a shaft section 46. The worm shaft 45 is journalled at a point immediately adjacent the worm 44 in a bracket 47 secured in position on the frame member 43', while the forward end of the shaft section 46 is journalled in a suitable bearing 48 secured at the upper side of the coupling member 31 at the forward end of the draft frame. The extreme forward end of the shaft section 46 is projected through the bearing 48 sufficiently to have secured thereon a hand wheel 49, by means of which motion is imparted to the cooperative parts for the angular adjustment of the several disc blades 23 of each of the gangs.

In Fgures 5 and 6, a modified form of actuating mechanism is shown for effecting the angular adjustment of the arm or lever 35, and in this instance, its free end is pivotally engaged, as at 50, to one end of an operating rod 51, which extends to one side of the forward side of the leading gang frame and pivotally connects a hand lever 52 at its opposite end. This hand lever 52 is pivoted at its lower end, as at 53, to the front member or bar of the leading gang frame for the proper swinging movements to effect the desired angular adjustments of the disc blades 23. Mounted on the front member or bar 10 of the leading gang frame is a rack 54, of semi-circular or segment form, with the toothed periphery of which, a pawl 55, carried by the hand lever 52, is cooperative. This pawl or detent 55 is mounted for sliding movement in a bracket 56, secured on one side of the hand lever 52, and is normally urged into engagement with the teeth of the rack by a coiled spring 57. The pawl or detent 55 is operated from a hand grip 58 pivoted, as at 59, adjacent the free end of the hand lever 52, and through the medium of a rod 60 connecting an angular extension formed at the pivoted end of the hand grip 58 at one of its ends, and the free end of the pawl or detent 55 at its other end.

In this latter instance, the disc blades 23 will be moved from normal positions to various angularly disposed positions of operation by the proper manipulation of the hand lever 52, in one direction of movement of the same, and secured in any desired position by the engagement of the pawl 55 with the teeth of the rack member 54. By releasing the pawl 55 from the rack member 54, the hand lever 52 will be moved in the opposite direction to return the disc blades 23 to normal position, when the pawl 52 will be released for engagement with the rack member 54 to secure the parts in such position.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a machine of the class described, a leading gang frame, a trailing gang frame, a plurality of disc blades carried by each of said frames, independent mountings for each of said disc blades, said mountings being adjustable to vary the vertical working angle of said disc blades, a draft frame carried at the forward side of said leading gang frame, and means operable from said draft frame for adjusting said mountings on both of said gang frames simultaneously to vary the horizontal working position of said disc blades.

2. A disk harrow comprising an oblong frame, a series of disk supports tiltably mounted in spaced relation longitudinally of the frame, a disk carrying shaft having an upright bearing journaled in each support, a crank-arm fixed on each bearing, and means pivotally connecting said crank arms for joint movement at any tilted position of the disk supports.

3. A disk harrow comprising an oblong frame including parallel frame members, a series of disk supports connecting said members and pivoted thereto for transverse tilting adjustment, a vertical shaft on each support, disk carrying shafts having upright sleeves journaled on said shafts, and means for simultaneously turning all said sleeves at any tilted position of the supports.

4. A disk harrow comprising, in combination, front and rear horizontally disposed oblong frames, each including front and rear bars extending on its longer dimension, a draft frame connected to the front bar of the foremost of said frames, a hitch piece carried by said draft frame towards one lateral end of said frames, one of said oblong frames being partially offset to one side of the outer thereof, a series of horizontal disk carrying shafts having separate vertical pivot portions connecting each shaft to the frame, means connecting said pivot portions for joint angular movement, and means for effecting said angular movement including an actuating element located adjacent the hitch piece of the draft frame.

5. A disk harrow comprising, in combination, front and rear horizontally disposed transversely elongated frames, means for connecting said frames in fixed partially offset parallel relation, a series of bearing members mounted on each of said frames in equally spaced relation on the longitudinal median lines thereof, the disks on one frame being offset to substantially centered position with respect to the disks on the other frame, disk carrying shafts having upright positions journalled in the bearing members, a draft frame at the front of the leading frame and offset toward that end of the same opposite to the direction of offset of the trailing frame, and means for simultaneously turning the said shafts to angle the disks, said means including an actuating device located on the draft frame.

6. A disk harrow comprising the combination of front and rear horizontally disposed oblong frames, means for connecting said frames in fixed parallel relation, a series of bearing members mounted on the respective frames at relatively offset points disposed in equally spaced relation on the longitudinal median lines of the frames, disk carrying shafts having upright portions journaled on the bearing members, crank-arms on said upright portions, links pivotally connecting the crank-arms for joint movement, a draft frame offset angularly to one side of the center line of draft of said oblong frames, and means for turning the standards to angle the disk carrying shafts comprising an actuating element on the forward end of the draft frame and power transmitting means between said element and the links.

7. A disk harrow comprising, in combination, front and rear horizontally disposed transversely elongated frames, means for connecting said frames in fixed partially offset parallel relation, a series of bearing members mounted on each of said frames in equally spaced relation on the longitudinal median lines thereof, the disks on one frame being offset to substantially centered position with respect to the disks on the other frame, disk carrying shafts having upright positions journalled in the bearing members, a draft frame at the front of the leading frame and offset toward that end of the same opposite to the direction of offset of the trailing frame, and means for simultaneously turning the said shafts to angle the disks, one series of the same in a direction reversed to the other, said means including an actuating device located on the draft frame.

JAMES S. STEWART.